ated Patent [19]

United States Patent [19]
Hughes

[11] Patent Number: 4,680,070
[45] Date of Patent: Jul. 14, 1987

[54] TUBES OF MICROPOROUS THERMAL INSULATION MATERIAL

[75] Inventor: John T. Hughes, Worcester, United Kingdom

[73] Assignee: Micropore International Limited, Droitwich, United Kingdom

[21] Appl. No.: 742,050

[22] Filed: Jun. 6, 1985

[30] Foreign Application Priority Data

Jun. 7, 1984 [GB] United Kingdom ............... 8414526

[51] Int. Cl.⁴ .............................................. B29C 1/00
[52] U.S. Cl. .................................. 156/218; 138/149; 138/151; 428/36
[58] Field of Search ............... 156/218, 215, 203, 466, 156/443; 138/128, 149, 151, 156; 428/36

[56] References Cited

U.S. PATENT DOCUMENTS

| 2,647,816 | 8/1953 | Battista | 156/218 X |
| 2,756,172 | 7/1956 | Kidd | 138/128 X |
| 3,279,503 | 10/1966 | Carbone et al. | 138/128 |
| 3,434,502 | 3/1969 | Snelling | 138/149 X |
| 3,807,458 | 4/1974 | Royston | 138/149 X |

Primary Examiner—David Simmons
Attorney, Agent, or Firm—Browdy & Neimark

[57] ABSTRACT

Tubes of microporous thermal insulation material are manufactured by compacting microporous material to a slab having a density of about 150–400 Kg/m³ and a thickness of about 1–5 mm, applying to one surface of the slab a membrane, for example of self-adhesive aluminum foil, wrapping the slab around a mandrel so that the ends of the slab abut substantially against each other, and securing the ends of the slab relative to each other, for example by means of a protruding flap of aluminum foil.

10 Claims, 5 Drawing Figures

TUBES OF MICROPOROUS THERMAL INSULATION MATERIAL

BACKGROUND OF THE INVENTION

The present invention relates to a method of manufacturing tubes of microporous thermal insulation material and to tubes made by such method. More particularly, but not exclusively, the present invention relates to tubes which have relatively thin walls.

DESCRIPTION OF PRIOR ART

It is well known to manufacture slabs and other simple shapes from microporous thermal insulation material by compacting the material in a die. This method produces a block of material which has an exceptionally low thermal conductivity but which is handleable only to a very limited extent because the material is relatively friable. It is therefore generally considered that the only post-forming operations which can be carried out on the material must be carried out by machining. For example, any attempt to bend the material will cause it to crack, but it may be cut to size and holes or depressions may be machined by suitable means.

Simple shapes which may be moulded include tubes, which may be formed using a die in the shape of an annulus. However, it has been found that there is a limit to the size of tube which can be formed in this way. Because of friction, the tubes do not have uniform density, but are relatively more dense in the region close to the compacting die and are relatively less dense in the region remote from the compacting die. When the wall thickness of the tube is small, this variation in density becomes a severe problem and thin walled tubes can only be made in very short lengths.

OBJECT OF THE INVENTION

It is an object of the present invention to provide a method of manufacturing tubes of microporous thermal insulation material which are not restricted as to length.

SUMMARY OF THE INVENTION

According to one aspect of the present invention there is provided a method of manufacturing a tube of microporous thermal insulation material, which method comprises the steps of:
  forming a substantially flat slab of microporous thermal insulation material;
  providing on one surface of the slab a membrane which is to form an outer skin of the tube to be produced;
  wrapping the slab and the membrane around a mandrel having a diameter corresponding to the internal diameter of the tube to be produced such that the ends of the slab abut substantially against each other; and
  securing the ends of the slab relative to each other.

According to another aspect of the present invention there is provided a tube of microporous thermal insulation material which comprises a slab of microporous thermal insulation material which is formed into the shape of an annulus with the ends of the slab abutting substantially against each other, and an outer skin which extends around the annulus so as to secure the ends of the slab relative to each other.

For a better understanding of the present invention and to show more clearly how it may be carried into effect reference will now be made, by way of example, to the accompanying drawings in which:

DESCRIPTION OF PREFERRED EMBODIMENTS

In order to produce a tube of microporous thermal insulation according to the present invention, a first step is to form a slab of insulation material An intimate mixture is formed from a finely divided powder, an opacifier, if needed, and reinforcing fibre. The finely divided material may be, for example, pyrogenic silica, carbon black or a finely divided metal oxide such as alumina or titania. The opacifier may be a radiation scattering material having a high refractive index such as titania, alumina, zirconia, iron oxide or chrome oxide, a radiation absorbing material such as carbon black or a radiation reflecting material such as a metal. The opacifier may be in the form of a powder, short fibres or flakes. The reinforcing fibre may be, for example, ceramic fibre, glass fibre or other inorganic or organic fibre and should have a minimum length of about 2 mm.

The relative proportions of the various materials depends on the intended use of the thermal insulation tube. For example, the higher the temperature at which the insulation material is to be used, the higher will be the proportion of opacifier used. However, the proportion of finely divided powder is typically about 40 to 90 percent by weight, the proportion of opacifier is typically 0 to 40 percent by weight and the proportion of reinforcing fibre is typically 1 to 50 percent by weight. A preferred insulation material contains about 63 percent by weight finely divided powder, 30 percent by weight opacifier and 7 percent by weight reinforcing fibre.

The intimate mixture is placed in a die and is compacted to a density generally in the range from 150 to 400 kg/m$^3$ to produce a flat slab of microporous thermal insulation material having a thickness typically in the range from 1 to 5 mm.

Figure 1:
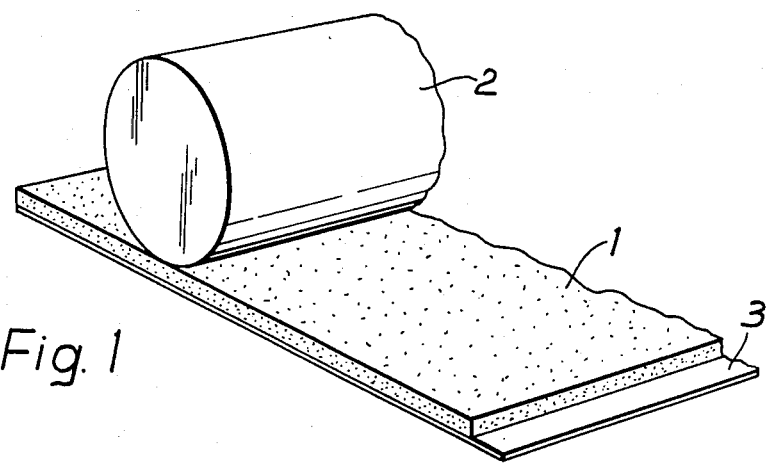
FIG. 1 is a diagrammatic representation of a stage in one embodiment of a method of producing a tube of microporous thermal insulation material according to the present invention.
Figure 2:
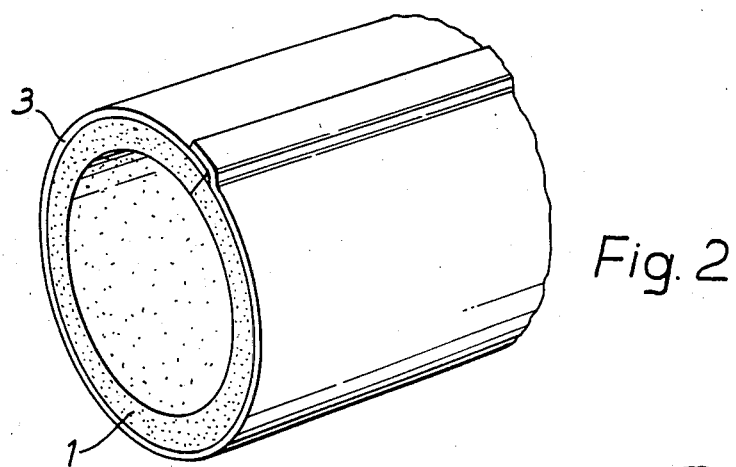
FIG. 2 shows one embodiment of a tube of microporous thermal insulation material according to the present invention.

As can be seen from FIG. 1, the slab 1 of microporous thermal insulation material, which is dimensioned so that it will conveniently wrap around a mandrel 2 of diameter equivalent to the internal diameter of the tube to be produced, is placed on a membrane 3 of material which is to form an outer skin of the tube to be produced.

The membrane 3 may be made from a sheet of any suitable material and is chosen, for example, so as to obtain a desired rigidity of the tube of insulation material. The membrane may be, for example, a self-adhesive tape or sheet of paper, plastics material, woven fabric or metal foil. It is not essential that the membrane should be self-adhesive because alternative methods of securing the ends of the slab may be employed.

Figure 3:
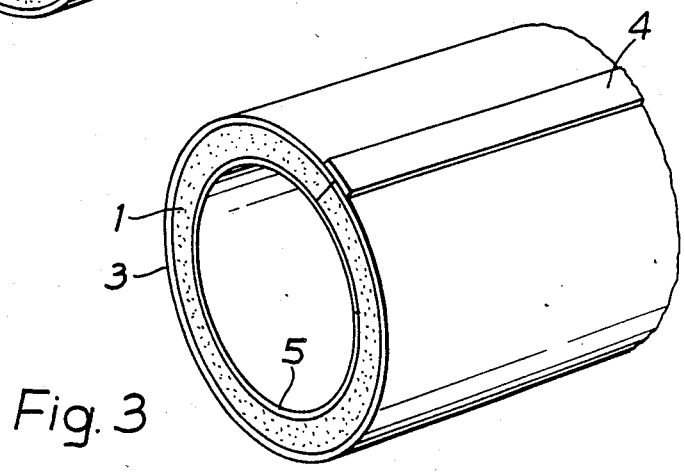
FIG. 3 shows another embodiment of a tube of microporous thermal insulation material according to the present invention.

The slab of insulation material and the membrane are wrapped around the mandrel, and the membrane is maintained in close contact with the insulation material, for example, by overlapping the membrane onto itself and by gluing the membrane to itself, by fixing an adhesive strip 4 along the edges of the membrane as shown in FIG. 3, or by passing a sleeve over the membrane (not shown).

When it is removed from the mandrel, the resulting tube is found to be unexpectedly robust and handleable.

Figure 4:
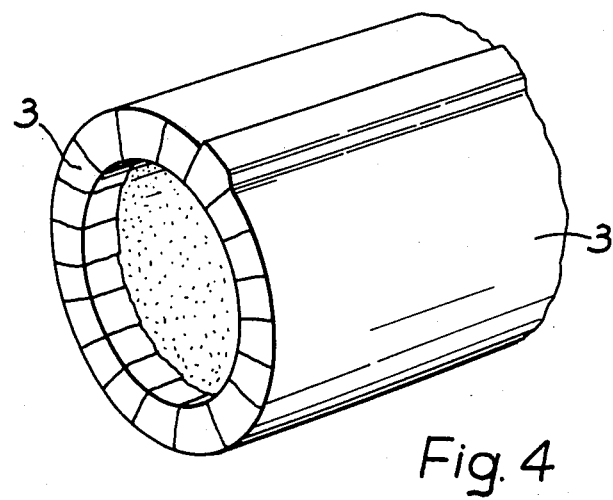
FIG. 4 shows an embodiment of a tube according to the present invention in which an outer skin is wrapped around the ends of the tube.

In cases where a skin is required on the inside of the tube of microporous thermal insulation material, such skin can be provided as shown in FIG. 3 by positioning a membrane 5 of suitable material around the mandrel before the slab 1 is wrapped around the mandrel. The ends of the tube are relatively friable and it may in some cases be considered desirable to protect the ends of the tube. This may be accomplished, as shown in FIG. 4 for example, by extending the outer membrane 3 laterally beyond the ends of the tube and subsequently wrapping the lateral portions of the membrane around the ends of the tube and into the bore thereof. We have found that this method is particularly satisfactory when the outer membrane comprises a metal foil. However, other methods may be used such as applying a glue, a cement or a polymeric material to the ends of the tube.

Figure 5:
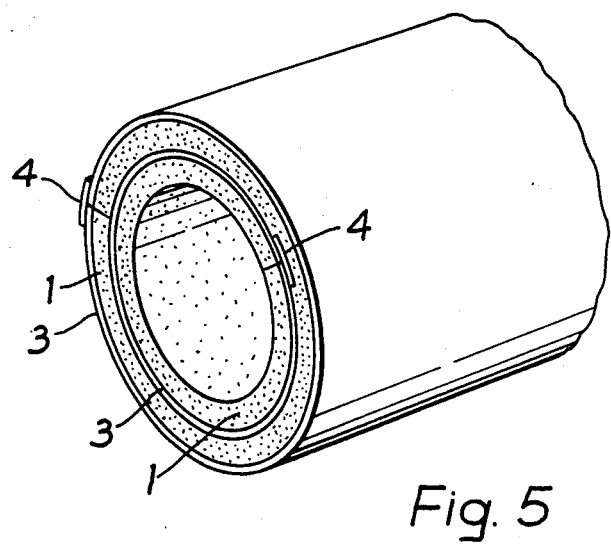
FIG. 5 shows an embodiment of a tube according to the present invention in which a further layer of microporous thermal insulation material is wrapped upon a base layer.

The method described above may be used to produce tubes of microporous thermal insulation material which have relatively thin walls. Where thick walled tubes are required these may be made as shown in FIG. 5 by wrapping one or more further slabs of microporous thermal insulation material upon the previous layer or layers.

I claim:

1. A method of manufacturing a tube of microporous thermal insulation material, which method comprises the steps of:

forming a substantially flat slab of microporous thermal insulation material;

said microporous thermal insulation material formed by compacting a finely divided powder selected from the group consisting of pyrogenic silica, carbon black, and finely divided metal oxides, said microporous thermal insulation material being relatively friable;

providing on one surface of the slab a membrane which is to form an outer skin of the tube to be produced;

wrapping the slab and the membrane around a mandrel having a diameter corresponding to the internal diameter of the tube to be produced such that the ends of the slab abut substantially against each other;

securing the longitudinally extending edges of the membrane relative to each other so as to form a tube; and removing the tube from the mandrel.

2. A method according to claim 1, wherein the microporous thermal insulation material is compressed to a density of about 150–400 Kg/m$^3$ in order to form the slab.

3. A method according to claim 1, wherein the slab has a thickness of about 1–5 mm.

4. A method according to claim 1, wherein the membrane comprises a tape or sheet selected from the group consisting of paper, plastics material, woven fabric and metal foil.

5. A method according to claim 4, wherein the membrane is self-adhesive.

6. A method according to claim 1, wherein the membrane is maintained in close contact with the microporous insulation material by overlapping the membrane onto itself and by securing the membrane to itself.

7. A method according to claim 1, wherein the membrane is maintained in close contact with the microporous insulation material by fixing an adhesive strip along the edges of the membrane.

8. A method according to claim 1, wherein a skin is provided on the inside of the tube by positioning a further membrane around the mandrel prior to wrapping the slab around the mandrel.

9. A method according to claim 1, wherein the membrane extends laterally beyond the longitudinally extending edges of the tube and the lateral portions are subsequently wrapped around the ends of the tube and into the bore thereof.

10. A method according to claim 1 and including the step of wrapping one or more further slabs of microporous thermal insulation material upon the previous layer or layers so as to increase the wall thickness of the tube.

* * * * *